United States Patent [19]

Abukawa et al.

[11] Patent Number: 4,639,625
[45] Date of Patent: Jan. 27, 1987

[54] DIRECT-CURRENT MACHINE HAVING PERMANENT MAGNET FIELD SYSTEM

[75] Inventors: Toshimi Abukawa, Hitachiohta; Kazuo Tahara; Noriyoshi Takahashi, both of Hitachi; Fumio Tajima, Jyuoh; Tosio Tomite, Katsuta, all of Japan

[73] Assignee: Hitachi, Ltd., Tokyo, Japan

[21] Appl. No.: 768,323

[22] Filed: Aug. 22, 1985

[30] Foreign Application Priority Data

Aug. 29, 1984 [JP] Japan ................. 59-178348

[51] Int. Cl.4 .................................. H02K 21/26
[52] U.S. Cl. ................ 310/154; 310/185; 310/254
[58] Field of Search ............ 310/46, 154, 44, 185, 310/186, 188, 40 MM, 256, 254, 152, 218; 335/296, 302; 324/151

[56] References Cited

U.S. PATENT DOCUMENTS

| 3,939,371 | 2/1976 | Murakami | 310/154 |
| 4,110,718 | 8/1978 | Odor | 335/296 |
| 4,445,059 | 4/1984 | Corbach | 310/154 |
| 4,469,969 | 9/1984 | Tomite | 310/154 |
| 4,471,252 | 9/1984 | West | 310/154 |

FOREIGN PATENT DOCUMENTS

| 0263877 | 12/1965 | Australia | 310/154 |
| 0050814 | 5/1982 | European Pat. Off. | 310/154 |
| 2550416 | 11/1975 | Fed. Rep. of Germany | 310/154 |
| 2637705 | 2/1978 | Fed. Rep. of Germany | 310/154 |
| 2267649 | 12/1975 | France | 310/154 |
| 0035721 | 10/1973 | Japan | 310/54 |

Primary Examiner—R. Skudy
Attorney, Agent, or Firm—Antonelli, Terry & Wands

[57] ABSTRACT

A direct-current machine having a rotor which includes a commutator, an armature core and an armature winding and is sustained rotatably in a field system constituted by a cylindrical housing and permanent magnets disposed inside the same. A demagnetizing force of an armature reaction due to an armature current is reduced by attaching a magnetic plate made of high saturation magnetic flux density material to a part of the pole-face of said field system of permanent magnets which is in the demagnetizing field.

11 Claims, 8 Drawing Figures

DIRECT-CURRENT MACHINE HAVING PERMANENT MAGNET FIELD SYSTEM

BACKGROUND OF THE INVENTION

This invention relates to a direct-current machine having a permanent magnet field system with auxiliary poles, wherein the field system is composed of permanent magnets and auxiliary poles.

A type of motor having a field system of permanent magnets and auxiliary poles in the form generally known until now is disclosed in Japanese Patent Laid-Open No. 35721/1973, wherein permanent magnets are distributed peripherally inside a cylindrical yoke and set in mutually opposing positions with an armature core and gaps interposed therebetween, and auxiliary poles made of a magnetic material which acts to intensify the magnetomotive force of an armature reaction are provided.

A motor of this kind has a disadvantage in that its permanent magnets are affected by the demagnetizing field of an armature reaction such as to be decreased in magnetic force. Once the permanent magnets are demagnetized, the motor does not work normally and loading can not be started because of lack of torque. It would be possible for the field system to be designed to keep the necessary magnetic force by giving the permanent magnet an increased radial thickness, but this would mean that the motor would have an uneconomically excessive weight and size.

SUMMARY OF THE INVENTION

A primary object of the invention is to eliminate the defect of the above described prior art and to provide a direct current machine having a field system of permanent magnets with auxiliary poles in which the auxiliary poles are adapted to provide an improved anti-demagnetizing effect with respect to the permanent magnets.

To this end, the invention discloses a means of providing a permanent magnet improved in anti-demagnetizing force which constist in attaching a member of high residual magnetic flux density material to the pole-face of the permanent magnet on the side where a demagnetizing force exists. By this means, it is possible for a part of the flux of the demagnetizing field to pass through the above member of high residual magnetic flux density material.

Accordingly a part of the demagnetizing force acting on the permanent magnet is reduced without any substantial damage to the intensifying effect of auxiliary pole. In such a manner, it is possible to improve a direct current machine having a field system of permanent magnets with auxiliary poles.

DESCRIPTION OF THE PREFERRED EMBODIMENTS

Figure 1:
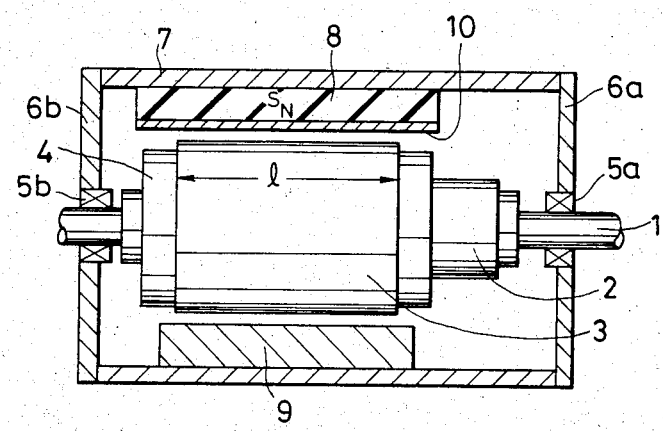
FIG. 1 is a axial sectional view of a motor having a field system of permanent magnets with auxiliary poles as first embodiment of the invention.
Figure 2:
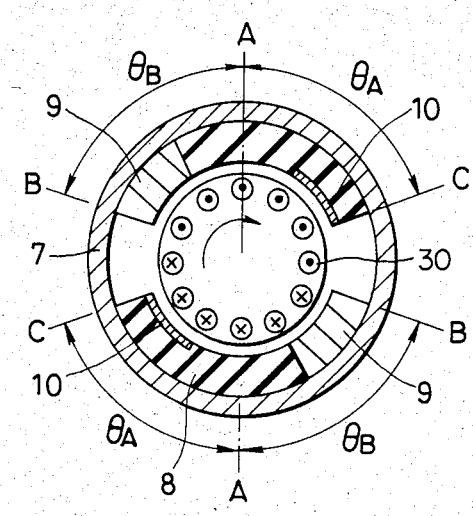
FIG. 2 is a radial sectional view of FIG. 1.

A first embodiment of the present invention will be described in detail hereinafter with reference to the drawings. FIG. 1 is an axial sectional view of a motor having a field system of permanent magnets with auxiliary poles, as a bipolar machine. FIG. 2 is a radial sectional view of the same. As shown in FIG. 1, a rotor comprising a shaft 1, a commutator 2, and an armature having an armature core 3 and a winding 30 wound around the armature core 3, is supported by bearing 5a and 5b which are held by end brackets 6a and 6b secured to a cylindrical yoke 7.

Figure 6:
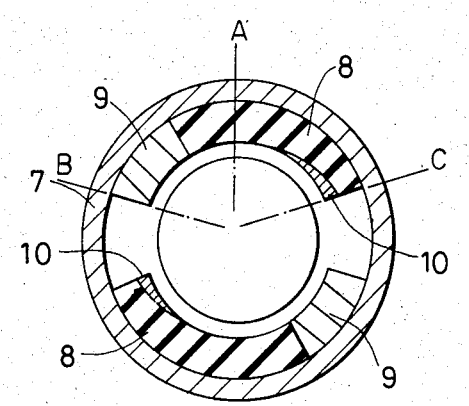

Inside the yoke 7, permanent magnets 8 and auxiliary poles 9 are placed side by side along the periphery. The auxiliary poles are made of a material which acts to intensify a magnetomotive force of an armature reaction. The magnetic plates 10 are made of a material of high saturation magnetic flux density attached to a part of the pole-face of the permanent magnets 8, proximate to the side C as shown in FIGS. 2 and 6, which is in a demagnetizing field, over the whole length of the same in the axial direction.

Figure 3:
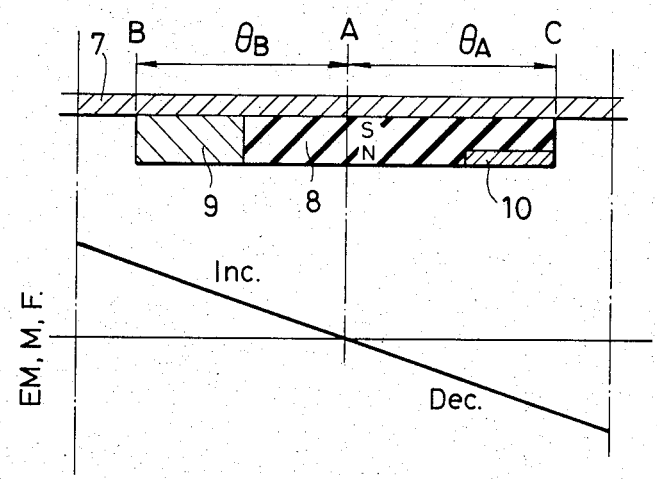
FIG. 3 is a distribution chart of a magnetomotive force of an armature reaction, relating to the movement of the motor of the invention.
Figure 4:
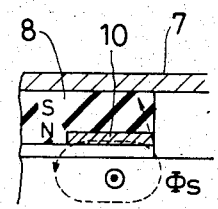
FIG. 4 is a chart indicating a magnetic flux of a demagnetizing field of FIG. 1.

The motor of the present invention, thus constructed, rotates in a direction which is determined on the basis of the directions of the current of the armature. In the case shown in FIG. 2, the rotor rotates clockwise as indicated by the arrow. When the armature current is one, the magnetomotive force of the armature reaction, as shown in FIG. 3, acts on the field pole consisting of the permanent magnet 8 and the auxiliary pole 9. FIG. 3 is a chart of the magnetomotive force of the armature reaction, developed along the rotational direction. The above magnetomotive force is distributed as an intensifying magnetic field in the range of A to B: $\theta_B$ and as a demagnetizing field in the range of A to C: $\theta_A$. The direction of the flux of the demagnetizing field is the reverse of that of the main flux of the permanent magnet. When such demagnetizing field acts on the permanent magnet, the magnetic flux $\Phi_s$ generated by the demagnetizing field passes through the magnetic plate 10 and returns to the rotor as shown in FIG. 4, as the magnetic plate 10 made of, e.g., soft steel is attached, in the manner shown in FIG. 2, to almost half of the A-C portion of the pole-face of the permanent magnet. This demagnetizing flux $\Phi_s$ passes to such amount as to saturate the magnetic plate 10 and does not act to reduce the main flux of the permanent magnet. Accordingly, when, for example starting the motor with large amounts of armature current, the magnetic plate 10 diverts a part of the demagnetizing field without any substantial damage to the intensifying effect of the auxiliary pole. The permanent magnet provided with the above facility is sufficiently resistant to the demagnetization to ensure that the characteristics of the motor do not deteriorate. Additionally, it is possible to adjust the intensifying effect of the auxiliary pole by properly setting the radial thickness of the magnetic plate 10.

The magnetic plate 10 can be constituted by soft steel or silicon steel plates, or made of sintered iron powder or ferrite core.

Figure 5:
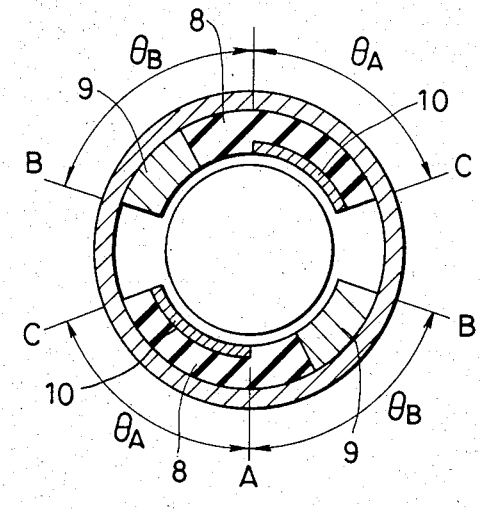
FIGS. 5, 6, 7 and 8 show other embodiments of the invention.

FIG. 5 shows a second embodiment of the invention in which the magnetic plate 10 attached to the pole-face of the permanent magnet 8 covers the whole range of the A-C: $\theta_A$ portion influenced by the demagnetizing field, so that the demagnetizing force acting on the permanent magnet 8 is reduced over the whole range of the demagnetizing field.

FIG. 6 shows a third embodiment of the invention in which the form of the magnetic plate 10 attached to the pole-face of the permanent magnet 8 gradually decreases in thickness from the side C where the demagnetizing field is strong, toward the portion A. This arrangement is as effective as that of the first embodiment.

Figure 7:
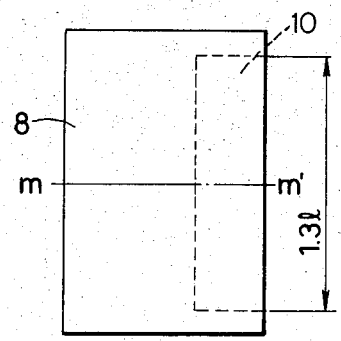
Figure 8:
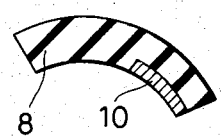

FIG. 7 is a plan view of the permanent magnet 8 and the magnetic plate 10 shown in dashed line attached to the same (the auxiliary pole 9 not being illustrated). FIG. 8 is a cross sectional view taken substantially on line m-m' of FIG. 7. As shown in these figures, the magnetic plate 10 does not cover the whole axial range of the permanent magnet, but is 1.3 times as long as the thickness of the armature lamination 1 (refer to FIG. 1). Since the demagnetizing field is not distributed throughout in the whole axial range of the permanent magnet, the above length of the magnetic plate 10 is adequate.

As the invention discloses the above means relating to the direct-current machine having a field system of permanent magnets with auxiliary poles, the demagnetizing force of an armature reaction can be reduced by placing magnetic material on the part of the pole face of the permanent magnet constituting the field pole which is in the demagnetizing field. The constitution of this method is most suitable for an automotive starter motor in which large amounts of armature current are employed and it contributes to the feasibility of reducing the weight and size of the motor and to production economy. It also reduces the amount of magnetic flux existing in the zone of a commutator, so that commutation is not impeded. Further, it is possible for the edge of the permanent magnet to be protected by the magnetic plate from impact when the rotor is being constructed such damage being proved to occur due to the attraction of the permanent magnet. Since the anti-demagnetizing force of the permanent magnet is improved, it is possible to use a battery having a greater capacity than a standard one for the purpose of driving the starter motor in cold weather.

What is claimed is:

1. A direct-current machine comprising: a rotor including an armature core, an armature winding and a commutator; and a stator including a yoke, and permanent magnets and auxiliary poles both placed side by side on the inner peripheral surface of said yoke, and a member of a high saturation magnetic flux density material which is placed on a part of a pole face of each of the permanent magnets, said part facing an air-gap and being under the influence of a demagnetizing field.

2. A direct-current machine according to claim 1, wherein said member is made of a material which is selected from the group: soft steel plate, silicon steel plate and sintered iron powder.

3. A direct-current machine according to claim 1, wherein said member covers the pole face of said permanent magnet over an axial length which is 1.3 times as long as a thickness of a lamination of the armature core.

4. A direct-current machine comprising:
a rotor rotatable in a predetermined direction, said rotor including an armature core, an armature winding and a commutator; and
a stator including a yoke, a plurality of permanent magnets magnetized in a radial direction and disposed on an inner peripheral surface of said yoke, a plurality of auxiliary poles for intensifying a magnetomotive force due to armature reaction, each of said auxiliary poles being attached to one side of each of said permanent magnets in the direction of rotation of said rotor, and magnetic means disposed on a portion of an inner surface of a respective permanent magnet proximate to a rearward end of said permanent magnet in the direction of rotation of said rotor for reducing the effect of a demagnetizing field acting on said permanent magnet and for enabling intensification of the magnetomotive force by said auxiliary pole, said magnetic means including a member of high saturation magnetic flux density material.

5. A direct-current machine according to claim 4, wherein said high saturation magnetic flux density material member is a plate member.

6. A direct-current machine according to claim 5, wherein said material of said plate member is soft steel.

7. A direct-current machine according to claim 5, wherein said material of said plate member is silicon steel.

8. A direct-current machine according to claim 5, wherein said material of said plate member is sintered iron powder.

9. A direct-current machine according to claim 5, wherein said plate member covers each of said permanent magnets over an axial length which is 1.3 times as long as a thickness of a lamination of said armature core.

10. A direct-current machine according to claim 5, wherein said plate member gradually decreases in thickness in the direction from the other side of each of said permanent magnets toward the one side of said permanent magnet.

11. A direct-current machine according to claim 4, wherein said magnetic means is configured so as to adjust the intensifying effect of said auxiliary pole and covers a portion of each of said permanent magnets at least over an axial length of said armature core.

* * * * *